(12) United States Patent
Kawamura et al.

(10) Patent No.: US 8,150,601 B2
(45) Date of Patent: Apr. 3, 2012

(54) EGR VALVE CONTROL SYSTEM

(75) Inventors: Satoshi Kawamura, Tokyo (JP);
Kazuaki Shinya, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 189 days.

(21) Appl. No.: 12/517,866

(22) PCT Filed: Oct. 25, 2007

(86) PCT No.: PCT/JP2007/070825
§ 371 (c)(1),
(2), (4) Date: Jun. 5, 2009

(87) PCT Pub. No.: WO2008/081643
PCT Pub. Date: Jul. 10, 2008

(65) Prior Publication Data
US 2010/0319664 A1  Dec. 23, 2010

(30) Foreign Application Priority Data
Dec. 28, 2006  (JP) .................... 2006-355896

(51) Int. Cl.
*F02M 25/07* (2006.01)
*F02B 47/08* (2006.01)
*G06F 19/00* (2011.01)

(52) U.S. Cl. .............. 701/108; 123/568.21; 123/568.24; 701/106

(58) Field of Classification Search .................. 318/569, 318/571, 599
See application file for complete search history.

(56) References Cited

U.S. PATENT DOCUMENTS

| 6,378,515 | B1 * | 4/2002 | Geyer | 123/683 |
| 6,467,469 | B2 * | 10/2002 | Yang et al. | 123/568.21 |
| 7,000,578 | B2 * | 2/2006 | Eiraku | 123/90.15 |
| 7,124,751 | B2 * | 10/2006 | Hardman et al. | 123/568.21 |
| 2005/0098127 | A1 | 5/2005 | Eiraku | |

FOREIGN PATENT DOCUMENTS

| EP | 0 750 103 A2 | 12/1996 |
| JP | 63-126002 A | 5/1988 |
| JP | 2-80801 U | 6/1990 |
| JP | 6-241098 A | 8/1994 |
| JP | 9-4520 A | 1/1997 |
| JP | 2000-54917 A | 2/2000 |
| JP | 2000-73830 A | 3/2000 |
| JP | 2000-234564 A | 8/2000 |
| JP | 2002-235606 A | 8/2002 |
| JP | 2005-146883 A | 6/2005 |
| JP | 2006-161627 A | 6/2006 |
| JP | 2006-317372 A | 11/2006 |

* cited by examiner

*Primary Examiner* — Stephen K Cronin
*Assistant Examiner* — Sherman Manley
(74) *Attorney, Agent, or Firm* — Birch, Stewart, Kolasch & Birch, LLP

(57) ABSTRACT

An EGR valve control system includes a motor 5 exercising the opening and closing control of an EGR valve; a sensor 6 detecting the actual opening position of the EGR valve; and a motor control apparatus (control arithmetic section 1) computing a drive duty of the motor 5 based on a target opening position of the EGR valve and the actual opening position thereof detected by the sensor 6; and the control apparatus is arranged such that the control arithmetic section 1, when a target opening position of the EGR valve is set, computes an integral term based on the deviation between the target opening position and the actual opening position of the EGR valve, a proportional term and a differential term based on the change of the actual opening position of the EGR valve, and a feedforward term based on the change of the target opening position, respectively, and the control arithmetic section further exercises the opening and closing control of the EGR valve by computing the drive duty of the motor 5 by performing addition and subtraction on the computed integral term, proportional term, differential term, and feedforward term.

2 Claims, 7 Drawing Sheets

FIG. 3
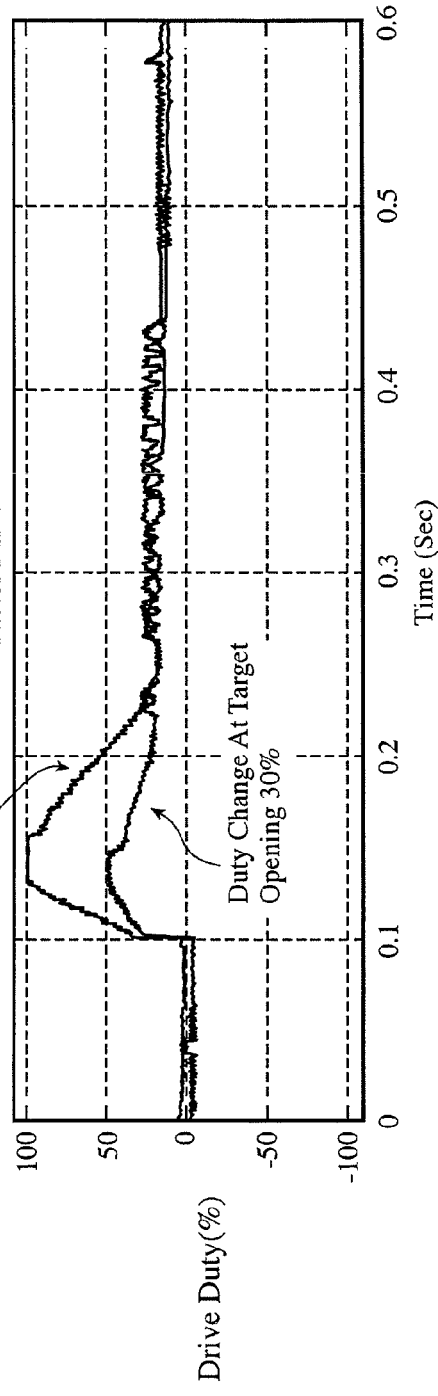
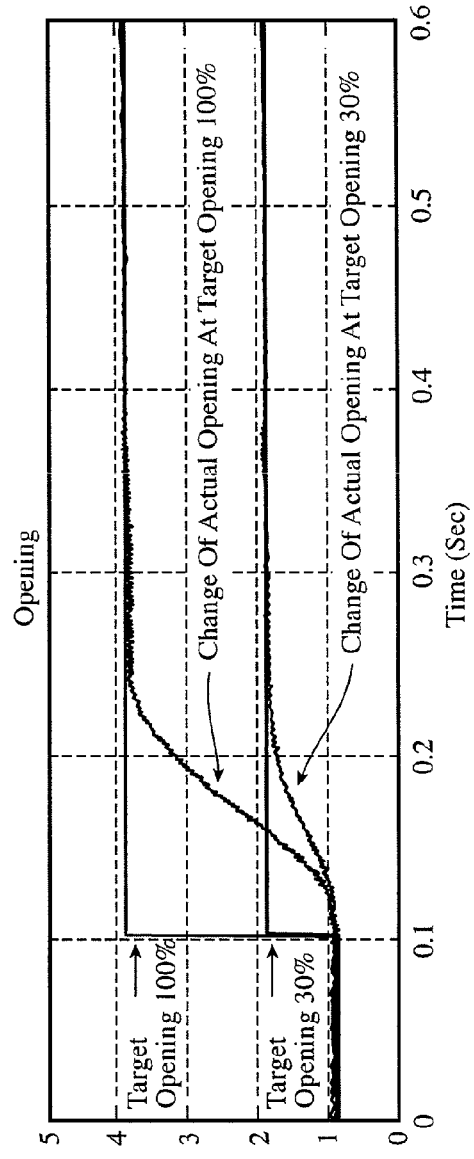

FIG. 7

(a) Constants At Pi-d Conrol

|  | P | I | D |
|---|---|---|---|
| Open | 330 | 14 | 0 |
| Close | 150 | 3 | 0 |

(b) Constants At I-pd+ff Conrol

|  | P | I | D | FF |
|---|---|---|---|---|
| Open | 600 | 30 | 0 | 165 |
| Close | 600 | 30 | 0 | 165 |

EGR VALVE CONTROL SYSTEM

TECHNICAL FIELD

The present invention relates to an EGR valve control system suitable for use in an exhaust gas recirculation system with a forced valve closing mechanism, which takes out part of exhaust gas from an exhaust system and circulates the part to an intake system.

BACKGROUND ART

Conventionally, some engines have mounted thereon an exhaust gas recirculation system (EGR system) which takes out a portion of exhaust gas from an exhaust system, controls the temperature, the taking out timing, and the flow rate of the portion, and recirculates the portion to an intake system. Burnt gas contains inert gases ($H_2O$, $N_2$, $CO_2$, and so on) as the main components, and when the burnt gas is put in a combustion fuel-air mixture, the highest combustion temperature of the mixture is reduced by the thermal capacity of the inert gases. Thus, the $NO_x$ contained in the exhaust gas can be reduced.

Further, an EGR system is arranged to have a flow rate control valve (EGR valve) provided in an exhaust gas recirculation path connecting an intake system and an exhaust system of an engine, open and close the EGR valve according to the operating state of the engine, and control the recirculation flow rate of the exhaust gas (EGR flow rate).

Incidentally, if the EGR valve breaks down under conditions where the valve is opened, black smoke or the like is discharged therethrough, thus reducing the commercial value of the vehicle. Therefore, in general, an automobile vehicle has a forced valve closing mechanism using a spring mounted thereon as a fail safe. Opening and closing control of the EGR valve uses a motor, and as the control algorithm therefor, PID control is frequently used, which exercises motion control over the motor by combining the controls of proportional control action, integral control action, and derivative control action.

Control actions by PID control can be expressed as a function, and the control function at that time includes control parameters, to be concrete, a proportional gain $K_p$, an integral gain $K_i$, a differential gain $K_d$, and a feedforward gain $K_{ff}$.

There have been numerous proposals for a method concerning the above-mentioned valve control by PID control. For example, a throttle control system is known where when deviation between a target opening and an actual opening is larger than a predetermined value, the response is improved by feedforward control and further, when the deviation therebetween is smaller than a predetermined value, the stability of the throttle valve is improved by settling the valve into its normal state by usual PID control (see, e.g., Patent Document 1). Further, another throttle control system is known where its response is improved by increasing the driving force of a motor by increasing a feedforward term computed based on the change of a target opening when the change of the target opening is small (see Patent Document 2).

Patent Document 1: JP-A-1994-241098
Patent Document 2: JP-A-2000-073830

However, according to the technology disclosed in Patent Document 1, since when the deviation between the target opening and the actual opening is small, the throttle opening is controlled by usual PID control to give priority to the stability of the control over the response thereof, a delay in response deteriorates the drivability thereof. Moreover, according to the technology disclosed in Patent Document 2, a delay in response of the throttle control in the case where the target opening slowly changes is prevented, the drivability at the time of stepping on an accelerator pedal improves, and further, the throttle opening stably settles into its target opening without overshooting by controlling a feedforward term computed based on the change of the target opening, on a small scale when the change of the target opening is large. However, there is a problem that under the circumstances where the target opening is frequently changed, stable response characteristics cannot be obtained to give insufficient follow-up capability.

The present invention has been made to solve the above-mentioned problems, and an object of the present invention is to provide a EGR valve control system where stable response characteristics can be obtained even under conditions where the target opening is frequently changed.

DISCLOSURE OF THE INVENTION

In order to solve the above-described problem, the EGR valve control system of the present invention includes a motor exercising the opening and closing control of an EGR valve; a sensor detecting the actual position of the EGR valve; and a motor control apparatus computing a drive duty of the motor based on a target position of the EGR valve and the actual position thereof detected by the sensor, and the EGR valve control system is arranged such that the motor control apparatus exercises the opening and closing control of the EGR valve by computing, when a target position of the EGR valve is set, an integral term based on the deviation between the target position of the EGR valve and the actual position thereof, a proportional term and a derivative term based on the change of the actual position of the EGR valve, and a feedforward term based on the change of the target position, respectively, and further calculating a drive duty of the motor by performing addition and subtraction on the above-computed integral term, proportional term, derivative term, and feedforward term.

According to the present invention, an EGR valve control system can be provided, capable of obtaining stable response characteristics even under the circumstances where the target opening is frequently changed.

BRIEF DESCRIPTION OF THE DRAWINGS

FIG. 3 is a pair of graphs depicting change in control input and change in opening of an EGR valve in proportional-and-differential preferential type PID control, respectively.

FIG. 7 is a pair of tables showing an example of a series of respective control constants when an EGR valve is opened and closed.

BEST MODE FOR CARRYING OUT THE INVENTION

Embodiments of the present invention will now be described with reference to the accompanying drawings in order to explain the present invention in more detail.

First Embodiment

Figure 1:
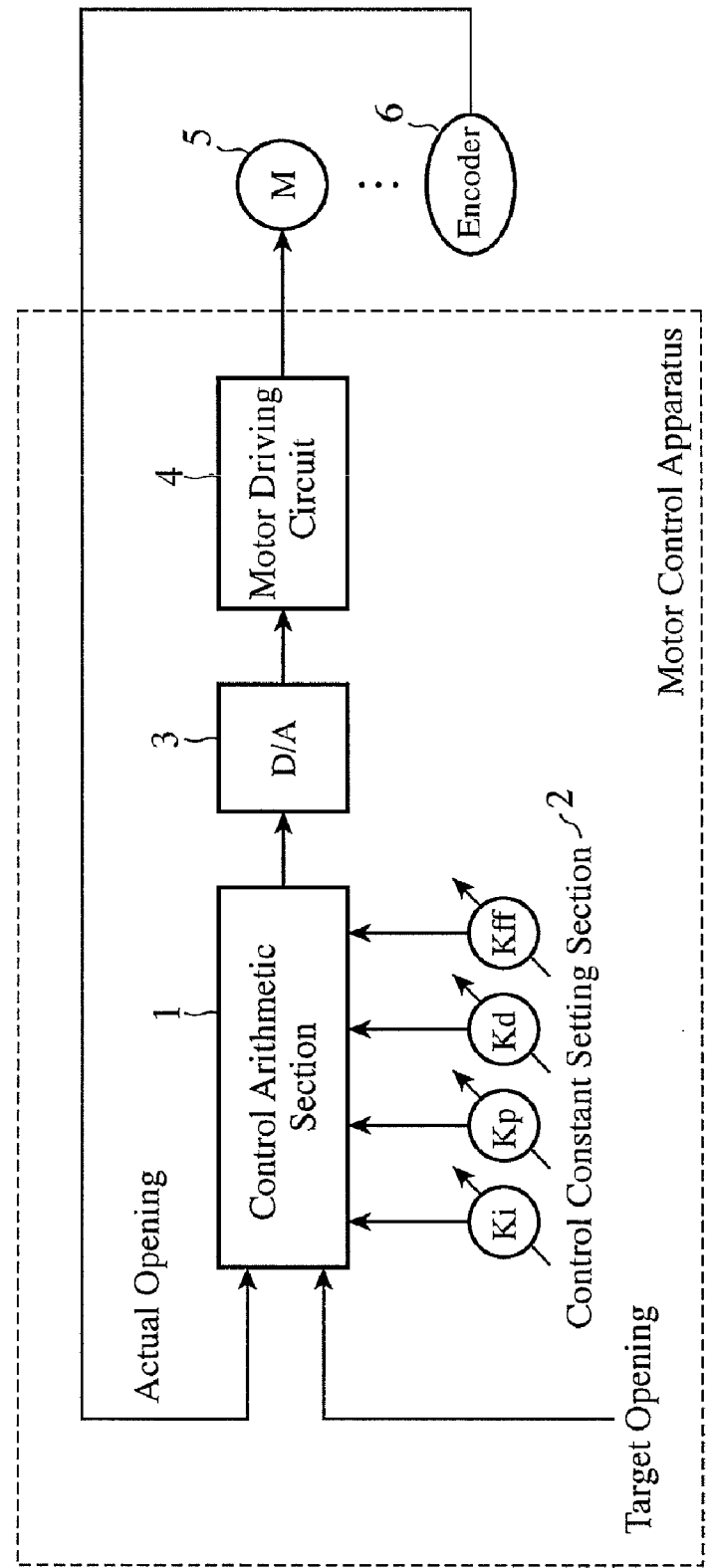
FIG. 1 is a block diagram showing an internal configuration of a valve control system according to the first embodiment of the present invention.

FIG. 1 is a block diagram showing an internal configuration of a valve control system according to the first embodiment of the present invention. As a controlled object, the figure illustrates an EGR valve in which the opening and closing control is performed by a direct current (DC) motor and having a forced valve closing mechanism by a spring.

As shown in FIG. 1, the EGR valve control system according to the first embodiment of the present invention is composed of a control arithmetic section 1, a control constant setting section 2, a D/A (Digital/Analog) converter 3, a motor driving circuit 4, a DC motor 5, and an encoder 6.

The optimum control constant consisting of a proportional gain $K_p$, an integral gain $K_i$, a differential gain $K_d$, and a feedforward gain $K_{ff}$ is set in the control arithmetic section 1 by the control constant setting section 2. The control arithmetic section 1 calculates the drive duty of the DC motor 5 based on the target position (target opening) of the EGR valve supplied from an external system and a control function obtained by substitution of the control constant previously set by the control constant setting section 2. The control arithmetic section 1 is further arranged to convert the calculated drive duty into an analog signal through the D/A converter 3, supply the signal to the motor driving circuit 4 to control the drive of the DC motor 5, and obtain the rotation angle (actual opening) of the DC motor 5 detected by the encoder 6 to exercise the feedback control thereof.

As mentioned above, the control arithmetic section 1 functions as a motor control apparatus calculating the drive duty of the DC motor 5 using the target position (target opening) of the EGR valve and the actual position (actual opening) thereof detected by the encoder 6. The internal configuration of the control arithmetic section 1 is shown by a block diagram in FIG. 5; however, the detail thereof will be mentioned later.

In this connection, though the encoder 6 is used here as a sensor detecting the actual position of the EGR valve, the encoder may be substituted by a Hall element. Further, as a method of controlling the rotation of the DC motor 5, the following PWM (Pulse Width Modulation) method shall be employed here: the DC motor 5 is driven by fixed-period pulses and the voltage of the motor is controlled by changing the duty factor (ON time ratio) of the pulse.

Note that the control arithmetic section 1 is often designed with a differential preferential type PID control (referred to as "PI-D control" hereinafter) method as a control method of the aforementioned EGR valve. In the PI-D control, as is well known, the control input (the duty factor of the pulse) is computed based on the deviation between the target position and the actual position of the EGR valve. Therefore, when the deviation is large, e.g., in a transition period like a rising period, the control input rapidly increases, thus increasing the rotation of the DC motor 5 and rendering impossible the control of the rotation speed. In contrast, in proportional-and-differential preferential type PID control (referred to as "I-PD control" hereinlater), the rotation speed is changed while adjusting the control input according to the change of the actual position of the EGR valve, and thus the control input does not rapidly increase.

In the EGR valve control system according to the first embodiment of the present invention, it is arranged that the control arithmetic section 1 be designed in accordance with the I-PD control method, and a delay in response time occurring due to the control method at about the time the valve opens to the midpoint be reduced with feedforward (FF) control. The detail thereof will be described later.

Figure 2:
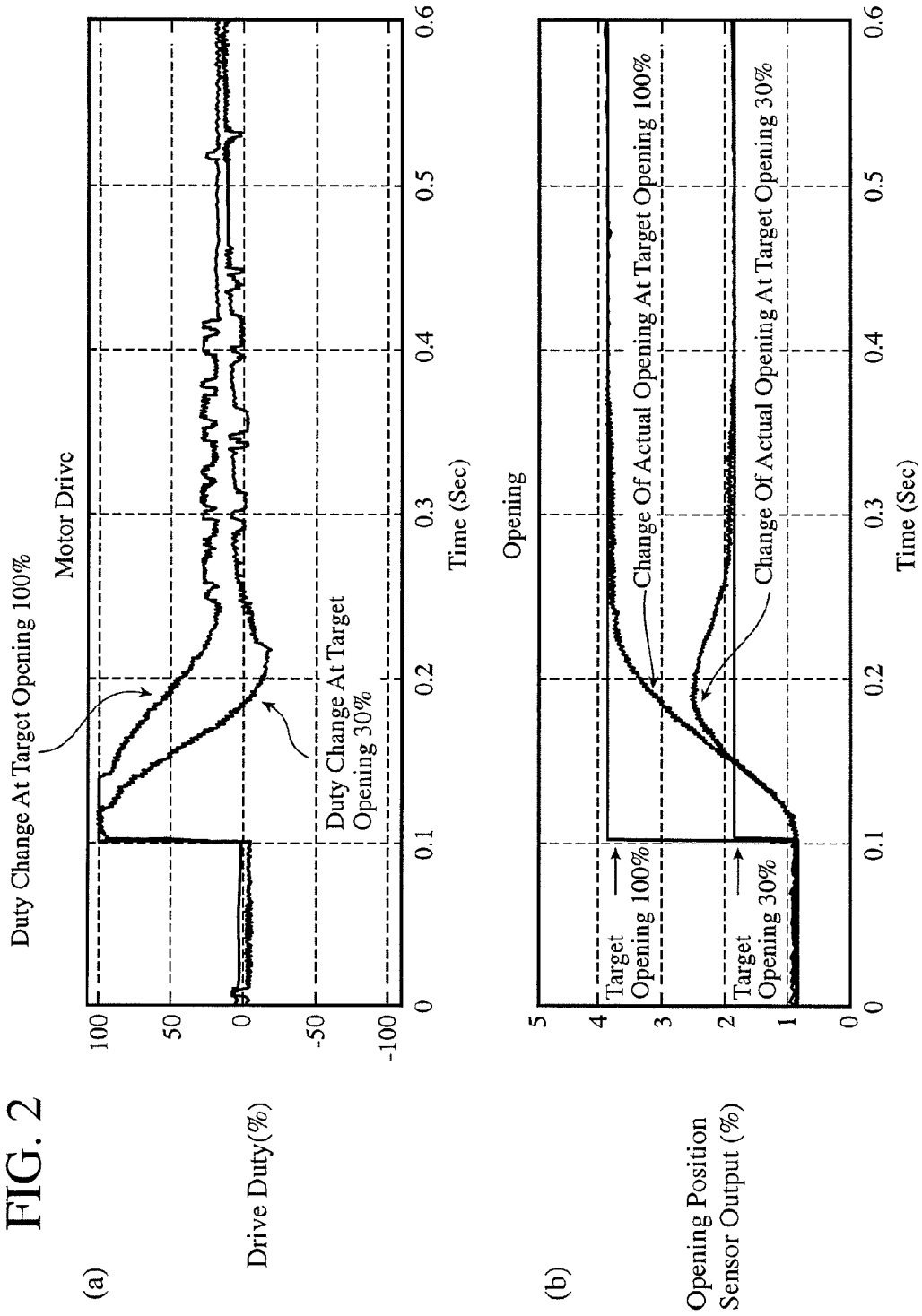
FIG. 2 is a pair of graphs depicting change in control input and change in opening of an EGR valve in differential preferential type PID control, respectively.
Figure 4:
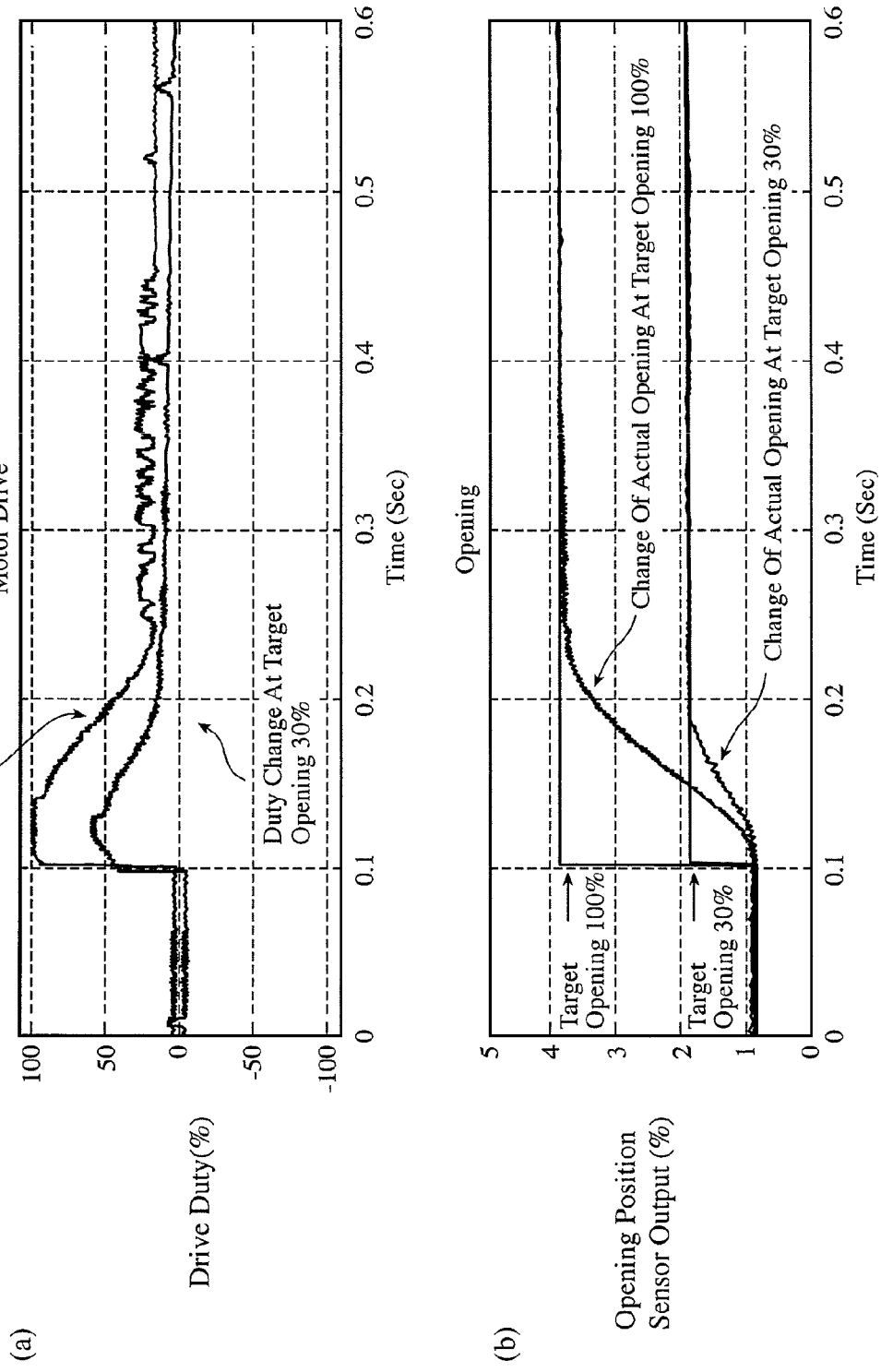
FIG. 4 is a pair of graphs depicting change in control input and change in opening of an EGR valve when feedforward control is added to proportional-and-differential preferential type PID control, respectively.

FIGS. 2 to 4 are figures showing, in graph form, change in control input and change in opening of an EGR valve (drive duty) in the above-described PI-D control, I-PD control, and control which is control where FF control is added to the I-PD control (referred to as "I-PD+FF control" hereinafter), respectively. In all of FIGS. 2 to 4, (a) a time-vs.-control input curve, and (b) a time-vs.-opening curve are shown on a time axis.

The detail of respective control methods using PI-D control, I-PD control, and I-PD+FF control will next be discussed with reference to FIGS. 2 to 4.

In the PI-D control shown in FIG. 2, the P (proportional) term and the I (integral) term act on the deviation, and the D (differential) term acts on the actual position. Usually, control constants are tuned between target openings of opening 0% and opening 100% in step response. The computation results in each term in those cases are shown.

When the step response of intermediate opening 0%→30%, e.g., is set as a target opening with the control constants as shown in FIG. 2, there are frequent occurrences of overshooting as shown in the figure. The results are based on the control constants that were tuned in a short response time without overshooting upon a step response of opening 0%→100% at the beginning. If the control constants in which the response was tuned in the step response in FIG. 2 are used, the P term acting on the deviation becomes extremely large, and the drive duty originally exceeds 100%. However, the control input causes overshooting in opening 30% since the P term is moved by the change of the target value.

Thus, the problem caused by the PI-D control is that even when tuning has been optimally performed in a full stroke operation, overshooting tends to occur near 0.2 sec in an intermediate opening as shown in FIG. 2 (b) and opening 30% is obtained near 0.3 sec. That is, it can be considered that since the change of drive duty appears in proportion to the changed width of the target value by the term P, the change of drive duty becomes too large when the change of opening is small, thus causing overshoot.

Otherwise, in the I-PD control shown in FIG. 3, the I term acts on the deviation, and the P term and D term act on the actual position. Since in the step response of opening 0%→100%, only the I term acts on the deviation, the drive duty, which is the computation result of the control input, is integrated, and the control input does not rapidly increase in the transition period unlike the case of the PI-D control.

According to the I-PD control method, when tuning has been optimally performed in a full stroke operation, overshooting does not occur in the intermediate opening. However, since the deviation is controlled by only the I term, the settling time into opening 30% is extended to 0.3 sec as shown in FIG. 3 (b), thus exhibiting a declining trend in an initial response in the intermediate opening.

In contrast, the initial response particularly in intermediate opening can be improved according to the I-PD+FF control shown in FIG. 4. To be more specific, in the PI-D control shown in FIG. 2, the drive duty is changed by multiplying the target value and the P term together; however, here, a control constant (FF term), which can be more freely set for the change of a target value, is newly added, and the drive duty is directly changed for the change of the target position, thus improving the response in the intermediate opening so that opening 30% may be obtained by 0.2 sec as shown in FIG. 4 (b).

As is apparent from comparison of the control method with the I-PD one shown in FIG. 3, the response in the movement of actual opening at the time of target opening 30% improves. It should be appreciated that the "FF control" refers to an automatic control, which performs a necessary adjustment operation such that even if a disturbance disturbing control occurs, before the disturbance exerts an influence thereon, the influence is reduced as far as possible ahead of time.

Figure 5:
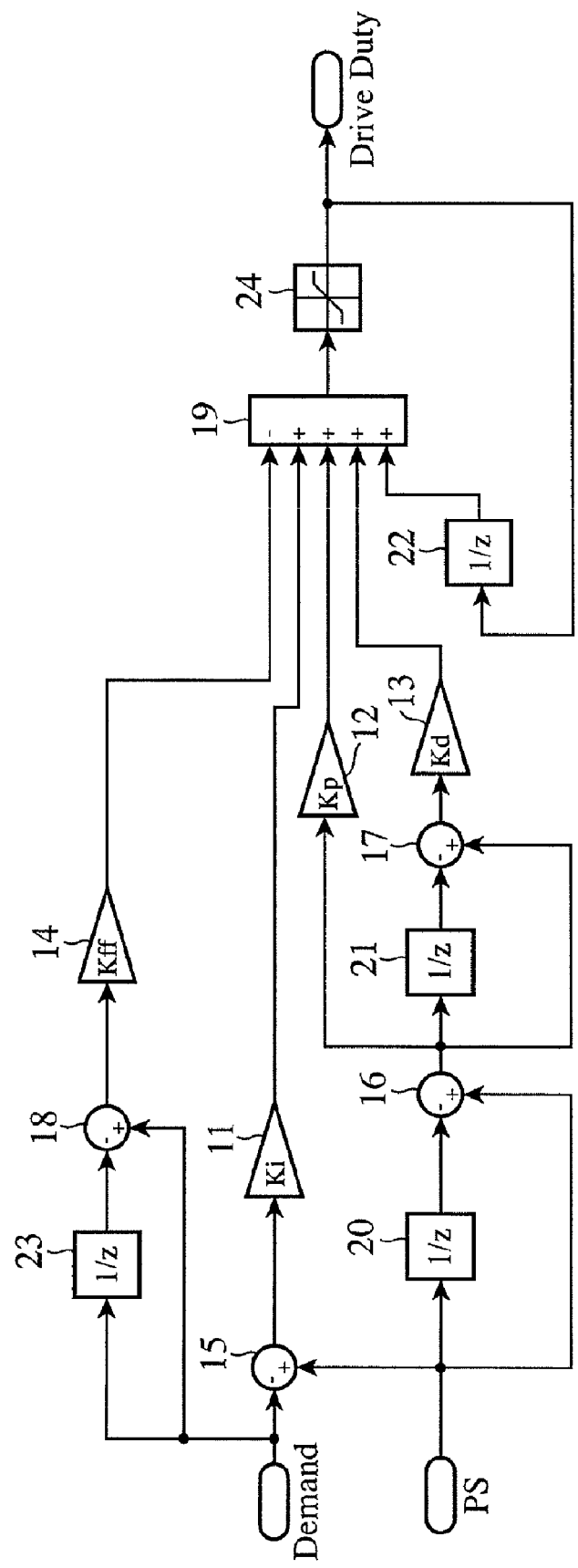
FIG. 5 is a block diagram showing an internal configuration thereof when the control arithmetic section shown in FIG. 1 is designed by adding feedforward control to proportional-and-differential preferential type PID control.

FIG. 5 shows, in a block diagram, an internal configuration thereof when the control arithmetic section 1 shown in FIG. 1 is designed with the I-PD+FF control method.

In FIG. 5, "Demand" denotes a target position, "PS" denotes the actual position, and "Drive Duty" denotes a control input. Further, reference numerals 11-14 denote function computing units for computing the respective functions of integral (I term), proportional (P term), differential (D term), and feedforward (FF term) based on the control constants set by the control constant setting section 2, reference numerals 15-19 denote adding-and-subtracting units, reference numerals 20-23 denote delay elements (1/Z), and reference numeral 24 denotes a gain adjusting unit, respectively.

The control arithmetic section 1, when the target position of the EGR valve is set from an external system (program), computes the I term with the function computing unit 11 based on the deviation between the target position of the EGR valve and the actual position thereof defined based on the rotation angle output by the encoder 5. Moreover, the control arithmetic section computes the P term and the D term based on the change of the actual position of the EGR valve with the function computing units 12,13, respectively. Furthermore, the control arithmetic section computes the FF term based on the change of the target position with the function computing unit 14.

Further, the control arithmetic section computes the drive duty of the DC motor 5 by performing addition and subtraction on the I term, the P term, the D term, and the FF term, which are previously computed with the adding-and-subtracting unit 19, makes a gain adjustment to the computed drive duty with the gain adjusting unit 24, and then supplies the obtained value to the DC motor 5 (via the D/A converter 3 and the motor driving circuit 4) as a control input.

In this connection, the optimum control constants (a proportional gain $K_p$, an integral gain $K_i$, a differential gain $K_d$, and a feedforward gain $K_{ff}$) shall be previously set in the function computing units 11-14 by the control constant setting section 2.

In the I-PD control, the I term acts on the deviation, and the P term and the D term act on the actual position; however, since the I term is set at a comparatively small value, the drive duty does not increase in the portion unlike the case of the PI-D control, and the drive duty is changed while adjusting the drive duty based on the change of the actual position. For this reason, the drive duty can be changed just before the control of the rotation speed becomes impossible. Since only the I term acts on the deviation, the response speed somewhat reduces; however, the delay can be reduced by the FF term. To say more precisely, the FF term comes to enable the drive duty to be directly changed for the change of the target position, and control by which the delay can be reduced as far as possible can be performed.

For this reason, the control arithmetic section 1 functions as a motor control apparatus for exercising the opening and closing control of an EGR valve, by computing, when a target position of the EGR valve is set, the I term based on the deviation between the target position and the actual position of the EGR valve, the P term and the D term based on the change of the actual position of the EGR valve, and the FF term based on the change of the target position, respectively, and further carrying out addition and subtraction on the I term, the P term, the D term, and the FF term, which are here computed, to calculate the drive duty of the DC motor 5.

Incidentally, an EGR valve is provided with a forced valve closing mechanism by a spring as described above, and the control constants on the open side and the control constants on the close side are different from each other. This is because, since the control constant on the open side should include a control gain for overcoming the repellent force of a spring, a comparatively large control gain is set thereon. If the same control constant is set also on the close side, deceleration becomes difficult because the drive duty increases. For this reason, selection is carried out about which control constants to be used according to the target position and the actual position of the EGR valve.

However, when the target position is frequently changed, "follow-up" results in becoming impossible according to whether an FF control constant on the open side is selected or that on the close side is selected. This is because, when setting, e.g., the FF control constant on the open side<the FF control constant on the close side, in spite of the fact that the drive duties at the time of driving on the close and open sides correspond to the same deviation, those drive duties on both the sides do not become equal to each other. For this reason, only the FF control constants shall be here set to the same value on the open and close sides. To be concrete, the control constant setting section 2, when the section sets the FF control constants for the control arithmetic section 1, should set the FF control constants of the EGR valve on the open and close sides at an equal value.

Figure 6:
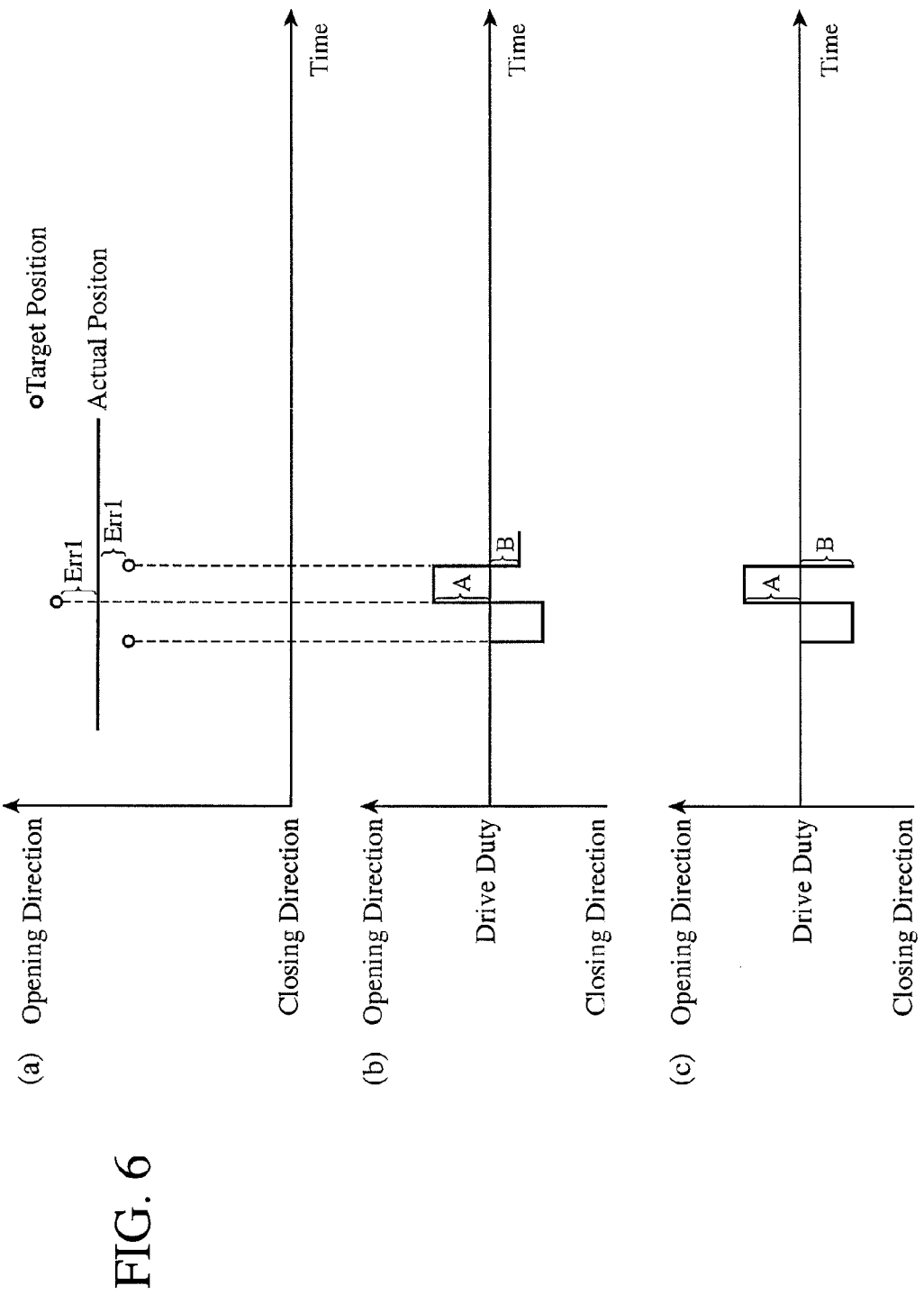
FIG. 6 is a collection of diagrams schematically showing control constants and drive duty on the open and close sides of an EGR valve on a time axis.

Specifically, in FIG. 6, control constants and drive duties on the open side (opening direction) and the close side (closing direction) of the EGR valve are schematically shown on a time axis.

Let the deviation (Err1) between the target position and the actual position of the EGR valve be in the relation shown in FIG. 6 (a), and when the FF control constant A on the open side and the FF control constant B on the close side are not equal to each other, even if the upward and downward changes of the target value are equal, the drive duties do not become equal as shown in FIG. 6 (b); however, when the FF control constant on the open side and the FF control constant on the close side are equal before and after the change of control, if the amounts of the upward and downward movements thereof are equal, the drive duties on both the sides are equal (A=B) as shown in FIG. 6 (c).

When the change of the target value is severe, according to the PI-D control, a gain of the same value has been given to the target position and the actual position; however, the existence of an FF term enables different values to be selected as control constants for the target position and the actual position, respectively. In this regard, the respective examples of control constants at the time of opening and closing an EGR valve in the I-PD+FF control and the P-ID control are contrastingly shown in FIGS. 7 (a) and (b).

As described above, according to the EGR valve control system according to the first embodiment of the present invention, in opening and closing control of an EGR valve, the overshoot occurring in the intermediate opening can be restricted by substituting the proportional-and-differential preferential type PID control for the differential preferential type PID control, and the delay in response time caused at that time can be reduced by the feedforward control. Therefore, response characteristics can be stably obtained even under the circumstances where the target opening is frequently changed.

Incidentally, in an EGR valve, movements of a valve shaft become unstable because of a change in the degree of hardness of grease or the like caused by changes of the temperature, thus widely or slightly varying the above-mentioned overshooting. However, even in the case where the drive duty rapidly increases, the control of rotation speed does not become impossible according to the I-PD control. The control of rotation speed is possible while the control input being adjusted according to the change of actual position of an EGR valve. Thus, it is also possible to take measures against the changes of the temperature.

It should be understood that all of the functions of units or blocks constituting the EGR valve control system according to the first embodiment of the present invention may be performed by use of software, and in another alternative, at least a portion of the functions thereof may be carried out by use of hard ware. For example, the processing executed by the control arithmetic section 1 and the data processing executed by the control constant setting section 2 may be performed by computer (microcomputer) using one or more programs, or at least part of the processing may be performed by hardware.

INDUSTRIAL APPLICABILITY

As mentioned above, the EGR valve control system according to the present invention is an EGR valve control system capable of obtaining stable response characteristics by introducing thereinto a control method employing proportional-and-differential preferential type PID control and feed forward control, and thus the apparatus is suitable, e.g., for an exhaust gas recirculation apparatus.

The invention claimed is:

1. An EGR valve control system used in an exhaust gas recirculation system taking out part of exhaust gas from an exhaust system and circulating the part to an intake system, the EGR valve control system comprising:
  a motor exercising opening and closing control of an EGR valve;
  a sensor detecting an actual position of the EGR valve; and
  a motor control apparatus computing a drive duty of the motor based on a target position of the EGR valve and the actual position thereof detected by the sensor,
  wherein the motor control apparatus exercises the opening and closing control of the EGR valve by computing, when a target position of the EGR valve is set, an integral term based on the deviation between the target position of the EGR valve and the actual position thereof, a proportional term and a derivative term based on the change of the actual position of the EGR valve, and a feedforward term based on the change of the target position, respectively, and further calculating a drive duty of the motor by performing addition and subtraction on the above-computed integral term, proportional term, derivative term, and feedforward term.

2. The EGR valve control system according to claim 1, wherein the motor control apparatus sets the feedforward constant of the EGR valve on the open side thereof and the feedforward constant thereof on the close side thereof to an equal value.

* * * * *